United States Patent

[11] 3,622,639

[72] Inventor Charles Carmen Cumbo
 Wilmington, Del.
[21] Appl. No. 734,870
[22] Filed June 6, 1968
[45] Patented Nov. 23, 1971
[73] Assignee E. I. du Pont de Nemours and Company
 Wilmington, Del.
 Continuation-in-part of application Ser. No. 677,768, Oct. 24, 1967, now abandoned,
 Continuation-in-part of application Ser. No. 712,598, Mar. 13, 1968, now abandoned.
 This application June 6, 1968, Ser. No. 734,870

[54] PROCESS FOR PREPARING HALOGENATED COMPOUNDS
 8 Claims, No Drawings

[52] U.S. Cl. .................................................. 260/649 DP,
 260/290 HL, 260/313.1, 260/332.5,
 260/346.1 R, 260/646, 260/649 R, 260/650 R
[51] Int. Cl. ........................................................ C07c 25/04,
 C07c 25/18
[50] Field of Search ............................................ 260/649,
 649 DP, 650, 612, 290 HL, 313.1, 332.5, 346.1,
 646

[56] References Cited
 UNITED STATES PATENTS

| | | | |
|---|---|---|---|
| 1,796,108 | 3/1931 | Kalischer et al. ............... | 260/650 |
| 1,822,982 | 9/1931 | Rusch et al. .................. | 260/650 X |
| 3,256,343 | 6/1966 | McCall et al. ................. | 260/650 X |
| 3,256,350 | 6/1966 | McCall et al. ................. | 260/650 |

FOREIGN PATENTS

| | | | |
|---|---|---|---|
| 98,433 | 12/1896 | Germany ...................... | 260/650 |
| 740,677 | 9/1943 | Germany ...................... | 260/652 |

OTHER REFERENCES

Websters New International Dictionary, Unabridged 2nd Ed. 1940, Meriam Co., Springfield, Mass. p. 158
Hackh's Chemical Dictionary, McGraw-Hill, New York, 4th Ed. 1969, p. 62.

*Primary Examiner*—Howard T. Mars
*Attorney*—Norbert F. Reinert

ABSTRACT: Aryl chlorides are prepared by contacting at elevated temperatures phosgene, carbon tetrachloride or a mixture of phosphgene and carbon tetrachloride and an aryl sulfonic acid, an alkali or alkaline earth metal arylsulfonate or any arylsulfonyl chloride. For example 4,4'-dichlorobiphenyl can be prepared by heating 4,4'-biphenyldisulfonic acid with at least two moles of phosgene or carbon tetrachloride per mole of the disulfonic acid to 250°C.

PROCESS FOR PREPARING HALOGENATED COMPOUNDS

RELATED APPLICATIONS

This application is a continuation-in-part of my copending applications Ser. No. 677,768, filed Oct. 24, 1967 now abandoned, and Ser. No. 712,598, filed Mar. 13, 1968 now abandoned.

BACKGROUND OF THE INVENTION

This invention relates to the preparation of aryl chlorides. Direct chlorination reactions are often nonselective in aromatic systems, giving somewhat random distribution of substitution by chlorine. Neither the number nor position of chlorine atoms introduced into an aromatic system by direct chlorination can be readily controlled.

The inadequacies of direct chlorination as a method of producing aryl chlorides have brought about attempts to utilize the more selective substitution patterns of sulfonation reactions; in many instances an aromatic ring can be sulfonated with only minimal formation of undesired isomers. However, known methods involving the displacement of sulfonic acid and sulfonyl chloride groups in aromatic systems with chlorine atoms have not been economically suitable for commercial utilization. Thionyl chloride has been used in one such method [Meyer *Montash*, 36, 719 (1915)], but this reaction gives only low yields or requires large excesses of thionyl chloride. It is also known to dissolve certain aryl sulfonic acids in water and treat with a halogen to effect partial displacement of the sulfonic acid groups with halogen. This reaction, however, also provides only low yields and frequently results in direct halogenation at positions other than that occupied by the sulfonic acid group.

The process of this invention provides an economical method for converting aryl sulfonic acids, alkali and alkaline earth metal arylsulfonates and arylsulfonyl chlorides to the corresponding aryl chlorides; high yields are readily attainable and the product is essentially isomerically pure. The ability to obtain aryl chlorides of high purity is a particularly surprising and important advantage of the process of this invention.

SUMMARY OF THE INVENTION

In summary, this invention is directed to a process for preparing an aryl chloride comprising contacting at elevated temperatures phosgene, carbon tetrachloride or a mixture of phosgene and carbon tetrachloride and an aryl sulfonic acid, an alkali or alkaline earth metal arylsulfonate or an arylsulfonyl chloride.

In a preferred embodiment of this invention, phosgene, carbon tetrachloride or a mixture of phosgene and carbon tetrachloride is contacted with 4,4'-biphenyldisulfonic acid, an alkali or alkaline earth metal 4,4'-biphenyldisulfonate or 4,4'-biphenyldisulfonyl chloride at elevated temperatures to obtain 4,4'-dichlorobiphenyl. In the most preferred method of producing 4,4'-dichlorobiphenyl, 4,4'-biphenyldisulfonic acid and carbon tetrachloride are contacted at a temperature of from 200° to 300° C.

It will be understood that by "aryl sulfonic acids" and "arylsulfonyl chlorides" is meant compounds containing one or more sulfonic acid groups and/or sulfonyl chloride groups attached to an aromatic nucleus. Typical aryl sulfonic acids and arylsulfonyl chlorides include those of the aromatic hydrocarbons such as benzene; substituted benzenes such as alkylbenzenes, nitrobenzenes and halogenated benzenes; coupled benzene rings such as biphenyl and terphenyl; fused benzene ring systems such as anthracene and phenanthrene and heterocyclic compounds such as imidazole, benzimidazole, quinoline pyridine, thiophene, pyrroles and furan.

It will of course be apparent to one skilled in the art that if the aryl compound used as starting material contains a functional group which is more reactive with phosgene and/or carbon tetrachloride than is the sulfonic acid or sulfonyl chloride group, side reactions can result. Such side reactions may or may not be desirable, depending upon the product desired. If such groups are present, more phosgene and/or carbon tetrachloride than would otherwise be necessary must ordinarily be used if the production of aryl chloride is to go to completion.

The overall reactions of phosgene and carbon tetrachloride with aryl sulfonic acid and alkali and alkaline earth metal arylsulfonates appear to proceed according to the following equations:

(1)
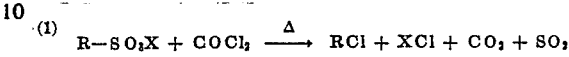

(2)
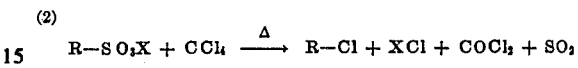

wherein R is an aryl group and X is hydrogen or an alkali or alkaline earth metal cation. Reaction (2) has been found to proceed at a considerably faster rate than reaction (1) and the aryl sulfonic acids have been found to react more rapidly then the corresponding alkali and alkaline earth metal sulfonates. It also appears that reactions (1) and (2) proceed through the corresponding arylsulfonyl chloride according to the following general equations:

(1')
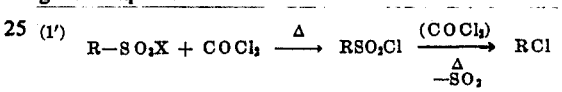

(2')
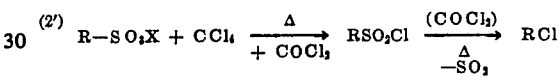

If an arylsulfonyl chloride is utilized as a starting material, the reactions differ considerably from reactions (1) and (2) above in that essentially no phosgene or carbon tetrachloride is consumed. Thus, the overall reactions which occur when an arylsulfonyl chloride is employed as a starting material can be represented by the following equations:

(3)
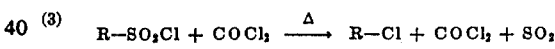

(4)
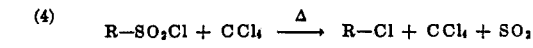

It has been discovered that if reaction (4) is conducted in the presence of at least a catalytic quantity of phosgene, the reaction rate is appreciably faster than if carbon tetrachloride alone is employed. Thus, when an arylsulfonyl chloride is reacted with at least a stoichiometric amount of carbon tetrachloride in the presence of a catalytic amount of phosgene the reaction can be represented by the following equation:

(5)
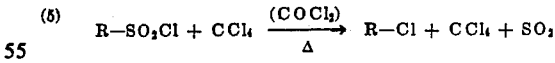

"(COCl₂)" denotes the use of a catalytic amount of phosgene. Referring to equation (2'), it will be seen that phosgene is produced during the first step in the reaction of carbon tetrachloride and an aryl sulfonic acid or sulfonate; the phosgene produced in turn increases the rate of the second step of (2'), according to equation (5).

Since carbon tetrachloride is usually somewhat more expensive than phosgene, it will ordinarily be more commercially attractive to employ the latter to produce aryl chlorides from aryl sulfonic acids and arylsulfonates. However, the converse may be true if the phosgene produced during the course of reaction (2) can be conveniently utilized by the manufacturer in other processes, e.g. the production of carbamyl chlorides, isocyanates, chloroformates and carbonates.

It will be appreciated that if both phosgene and carbon tetrachloride are present in a reaction mixture containing an aryl sulfonic acid, arylsulfonate or arylsulfonyl chloride, two or more of the reactions discussed above can be expected to proceed simultaneously, although at different rates depending on process conditions such as concentrations, temperatures, etc.

From the preceding discussion it will be seen that when phosgene is reacted with aryl sulfonic acid or alkali or alkaline earth metal arylsulfonate one mole of phosgene per sulfonic acid equivalent is consumed. Since the reaction of an aryl sulfonic acid or arylsulfonate with carbon tetrachloride proceeds more rapidly than does the reaction with phosgene, essentially one mole of carbon tetrachloride per sulfonic acid equivalent is consumed even though phosgene is present as a by product. Although essentially no phosgene or carbon tetrachloride is consumed when an arylsulfonyl chloride is used as a starting material, at least one mole of phosgene or carbon tetrachloride per sulfonic acid equivalent is preferably employed. An arylsulfonyl chloride is most readily converted to the corresponding aryl chloride by contacting it with at least one mole of carbon tetrachloride per sulfonic acid equivalent and a catalytic amount of phosgene; use of at least one-tenth mole of phosgene per sulfonic acid in this embodiment is preferred. Because of the highly reactive nature of phosgene, carbon tetrachloride and the free radicals which are apparently present during the course of the reactions discussed above, it is ordinarily preferred to use excess carbon tetrachloride and/or phosgene, rather than extraneous solvents or suspending media, in carrying out the process of this invention. Thus, it is ordinarily preferred to employ at least 1.25 moles, and most preferably at least 1.5 moles, of phosgene or carbon tetrachloride per sulfonic acid equivalent in the arylsulfonic acid, arylsulfonate or arylsulfonyl chloride.

The presence of water in the sulfonic acid, sulfonates or sulfonyl chloride and in the solvent or suspending medium should be avoided since water will destroy an equivalent amount of phosgene, thereby reducing the economics of the process. The sulfonic acid, sulfonate or sulfonyl chloride should also be essentially free of sulfuric acid, i.e., not more than 1 percent by weight, if optimum results are to be obtained. Commercially available phosgene is generally quite pure and does not require any special purification prior to use.

The process of this invention is preferably carried out at temperatures of from 200° to 300° C., and most preferably at temperatures of from 230° to 270° C. From about 0.1 to about 24 hours are ordinarily required for the reaction to go to completion. The reaction is most conveniently carried out in an autoclave under autogenous or higher pressures. Removal of any excess carbon tetrachloride and/or phosgene after cooling of the reaction mixture gives a good yield of high-purity product.

As will be apparent to those skilled in the art, the process of this invention can be carried out in either a batch or continuous manner.

The method of this invention is further illustrated by the following specific examples.

EXAMPLE 1

31.4 parts by weight of dry, sulfuric acid-free 4,4'-bi-phenyldisulfonic acid and 340 parts by weights of carbon tetrachloride are charged into an autoclave having a volume of about three times that of the reactants. The autoclave is sealed, heated to 250° C. and maintained at that temperature for 7 hours. The autoclave is then cooled to ambient temperature, excess gases are released, the autoclave is opened and the contents are removed.

The excess carbon tetrachloride is removed by distillation, leaving 21.1 parts by weight of essentially pure 4,4'-dichlorobiphenyl. The yield in hand is 95 percent of theoretical. The product is analyzed by infrared spectroscopy, N.M.R. and gas-liquid phase chromotography and is found to be isomerically pure.

EXAMPLE 2

18.0 parts by weight of dry, sulfuric acid-free benzene sulfonic acid and 340 parts by weight of carbon tetrachloride are charged into an autoclave having a volume about three times that of the reactants. The autoclave is sealed, heated to 230° C. and maintained at that temperature for 8 hours. The autoclave is then cooled to ambient temperature, excess gases are released, the autoclave is opened and the contents are removed. The excess carbon tetrachloride is removed by stripping and distillation of the residue gives monochlorobenzene.

EXAMPLE 3

42.0 parts by weight of dry, sulfuric acid-free 2-naphthalenesulfonic acid and 340 parts by weight of carbon tetrachloride are charged into an autoclave which is then sealed, heated to 270° C. and maintained at the temperature for 5 hours. The autoclave is then cooled to ambient temperature, excess gases are released, the autoclave is opened and the contents are removed. The excess carbon tetrachloride is removed by distillation to give a residue of 2-chloronaphthalene.

EXAMPLE 4

23.4 parts by weight of dry, sulfuric acid-free biphenyl-4-sulfonic acid and 340 parts by weight of carbon tetrachloride are charged into an autoclave which is sealed, heated to 250° C. and maintained at that temperature for 7 hours. The autoclave is then cooled to ambient temperature, excess gases are released, the autoclave is opened and the contents are removed. The excess carbon tetrachloride is removed by distillation to give 4-chlorobiphenyl.

EXAMPLE 5

35.8 parts by weight of disodium 4,4'-biphenyldisulfonate and 340 parts by weight of carbon tetrachloride are charged into an autoclave having a volume about three times that of the reactants. The autoclave is sealed, heated to 260° C. and maintained at that temperature for 7 hours. The autoclave is then cooled to ambient temperature, excess gases are released, the autoclave is opened and the contents are removed. The excess carbon tetrachloride is removed by distillation. Analysis of the crude product shows it to be 4,4'-dichlorobiphenyl. The yield is almost quantitative based on the amount of sulfonate salt reacted.

EXAMPLE 6–31

Example 1 is repeated substituting individually for the 4,4'-biphenyldisulfonic acid an equivalent amount of the sulfonic acids, sulfonates and sulfonyl chlorides indicated below. The indicated products are obtained.

| Ex. | Sulfonic acid, sulfonates and sulfonyl chlorides | Product |
| --- | --- | --- |
| 6 | 1-naphthalenesulfonic acid | 1-chloronaphthalene. |
| 7 | 1,3-benzenedisulfonic acid | 1,3-dichlorobenzene. |
| 8 | 1,3,5-benzenetrisulfonic acid | 1,3,5-trichlorobenzene. |
| 9 | 1,5-naphthalenedisulfonic acid | 1,5-dichloronaphthalene. |
| 10 | 1-anthracenesulfonic acid | 1-chloroanthracene. |
| 11 | 1,5-anthracenedisulfonic acid | 1,5-dichloroanthracene. |
| 12 | 1,8-anthracenedisulfonic acid | 1,8-dichloroanthracene. |
| 13 | 2-phenanthrenesulfonic acid | 2-chlorophenanthrene. |
| 14 | 3-phenanthrenesulfonic acid | 3-chlorophenanthrene. |
| 15 | 4-chlorobenzenesulfonic acid | 1,4-dichlorobenzene. |
| 16 | 3-pyrenesulfonic acid | 3-chloropyrene. |
| 17 | 2-fluorenesulfonic acid | 2-chlorofluorene. |
| 18 | 4-methylbenzenesulfonic acid | 4-chlorotoluene. |
| 19 | 3-nitrobenzenesulfonic acid | 3-chloronitrobenzene. |
| 20 | 4,4'-oxydibenzenesulfonic acid | Bis(4-chlorophenyl)-ether. |
| 21 | Calcium 1-naphthalenesulfonate | 1-chloronaphthalene. |
| 22 | Dipotassium 1,3-benzenedisulfonate | 1,3-dichlorobenzene. |
| 23 | Lithium 2-phenanthrenesulfonate | 2-chlorophenanthrene. |
| 24 | 2-pyrrolesulfonic acid | 2-chloropyrrole. |
| 25 | 2-furansulfonic acid | 2-chlorofuran. |
| 26 | 2-thiophenesulfonic acid | 2-chlorothiophene. |
| 27 | 3-pyridinesulfonic acid | 3-chloropyridine. |
| 28 | 4,4'-biphenyldisulfonyl chloride | 4,4'-dichlorobiphenyl. |
| 29 | Benzenesulfonyl chloride | Chlorobenzene. |
| 30 | 2-naphthalenesulfonyl chloride | 2-chloronaphthalene. |
| 31 | Biphenyl-4-sufonyl chloride | 4-chlorobiphenyl. |

EXAMPLE 32

31.4 parts by weight of dry, sulfuric acid-free 4,4'-bi-phenyldisulfonic acid and 40 parts by weight of phosgene are charged into an autoclave having a volume of about three times that of the reactants. The autoclave is sealed, heated to 250° C. and maintained at that temperature for 7 hours. The autoclave is then cooled to ambient temperature, excess gases are released, the autoclave is opened and the contents are removed. The excess phosgene is removed by distillation to give a residue of 4,4'-dichlorobiphenyl.

EXAMPLES 33–58

Example 32 is repeated substituting individually for the 4,4'-biphenyldisulfonic acid an equivalent amount of the sulfonic acids, sulfonates and sulfonyl chlorides indicated below. The indicated products are obtained.

| Ex. | Sulfonic acid, sulfonates and sulfonyl chlorides | Product |
| --- | --- | --- |
| 33 | 1-naphthalenesulfonic acid | 1-chloronaphthalene. |
| 34 | 1,3-benzenedisulfonic acid | 1,3-dichlorobenzene. |
| 35 | 1,3,5-benzenetrisulfonic acid | 1,3,5-trichlorobenzene. |
| 36 | 1,5-naphthalenedisulfonic acid | 1,5-dichloronaphthalene. |
| 37 | 1-anthracenesulfonic acid | 1-chloroanthracene. |
| 38 | 1,5-anthracenedisulfonic acid | 1,5-dichloroanthracene. |
| 39 | 1,8-anthracenedisulfonic acid | 1,8-dichloroanthracene. |
| 40 | 2-phenanthrenesulfonic acid | 2-chlorophenanthrene. |
| 41 | 3-phenanthrenesulfonic acid | 3-chlorophenanthrene. |
| 42 | 4-chlorobenzenesulfonic acid | 1,4-dichlorobenzene. |
| 43 | 3-pyrenesulfonic acid | 3-chloropyrene. |
| 44 | 2-fluorenesulfonic acid | 2-chlorofluorene. |
| 45 | 4-methylbenzenesulfonic acid | 4-chlorotoluene. |
| 46 | 3-nitrobenzenesulfonic acid | 3-chloronitrobenzene. |
| 47 | 4,4'-oxydibenzenesulfonic acid | Bis(4-chlorophenyl)-ether. |
| 48 | Calcium 1-naphthalenesulfonate | 1-chloronaphthalene. |
| 49 | Dipotassium 1,3-benzenedisulfonate | 1,3-dichlorobenzene. |
| 50 | Lithium 2-phenanthrenesulfonate | 2-chlorophenanthrene. |
| 51 | 2-pyrrolesulfonic acid | 2-chloropyrrole. |
| 52 | 2-furansulfonic acid | 2-chlorofuran. |
| 53 | 2-thiophenesulfonic acid | 2-chlorothiophene. |
| 54 | 3-pyridinesulfonic acid | 3-chloropyridine. |
| 55 | 4,4'-biphenyldisulfonyl chloride | 4,4'-dichlorobiphenyl. |
| 56 | Benzenesulfonyl chloride | Chlorobenzene. |
| 57 | 2-naphthalenesulfonyl chloride | 2-chloronaphthalene. |
| 58 | Biphenyl-4-sulfonyl chloride | 4-chlorobiphenyl. |

EXAMPLE 59

35.0 parts by weight of dry 4,4'-biphenyldisulfonyl chloride, 5 parts by weight of phosgene and 200 parts by weight of carbon tetrachloride are charged into an autoclave having a volume of about three times that of the reactants. The autoclave is sealed, heated to 250° C. and maintained at that temperature for 7 hours. The autoclave is then cooled to ambient temperature, excess gases are released, the autoclave is opened and the contents are removed.

The carbon tetrachloride is removed by distillation, leaving 22.2 parts by weight of essentially pure 4,4'-dichlorobiphenyl. The yield in hand is 99 percent of theoretical. The product is analyzed by infrared spectroscopy, N.M.R. and gas-liquid phase chromotography and is found to be isomerically pure.

EXAMPLE 60

18.0 parts by weight of benzenesulfonyl chloride, 3 parts by weight of phosgene and 300 parts by weight of carbon tetrachloride are charged into an autoclave having a volume about three times that of the reactants. The autoclave is sealed, heated to 230° C. and maintained at that temperature for 14 hours. The autoclave is then cooled to ambient temperature, excess gases are released, the autoclave is opened and the contents are removed. The carbon tetrachloride is removed by stripping and distillation of the residue gives chlorobenzene.

EXAMPLE 61

42.0 parts by weight of 2-naphthalenesulfonyl chloride, 5 parts by weight of phosgene and 340 parts by weight of carbon tetrachloride are charged into an autoclave having a volume about three times that of the reactants. The autoclave is sealed, heated to 270° C. and maintained at the temperature for 5 hours. The autoclave is then cooled to ambient temperature, excess gases are released, the autoclave is opened and the contents are removed. The carbon tetrachloride is removed by distillation to give a residue of 2-chloronaphthalene.

EXAMPLE 62

23.4 parts by weight of biphenyl-4-sulfonyl chloride, 4 parts by weight of phosgene and 340 parts by weight of carbon tetrachloride are charged into an autoclave which is sealed, heated to 250° C. and maintained at that temperature for 7 hours. The autoclave is then cooled to ambient temperature, excess gases are released, the autoclave is opened and the contents are removed. The carbon tetrachloride solvent is removed by distillation to give 4-chlorobiphenyl.

EXAMPLES 63–81

Example 59 is repeated substituting individually for the 4,4'-biphenyldisulfonyl chloride an equivalent amount of the sulfonyl chlorides indicated below using 0.1 mole of phosgene per sulfonyl chloride equivalent. The indicated products are obtained.

| Ex. | Sulfonyl chloride | Product |
| --- | --- | --- |
| 63 | 1-naphthalenesulfonyl chloride | 1-chloronaphthalene. |
| 64 | 1,3-benzenedisulfonyl chloride | 1,3-dichlorobenzene. |
| 65 | 1,3,5-benzenetrisulfonyl chloride | 1,3,5-trichlorobenzene. |
| 66 | 1,5-napthalenedisulfonyl chloride | 1,5-dichloronaphthalene. |
| 67 | 1-anthracenesulfonyl chloride | 1-chloroanthracene. |
| 68 | 1,5-anthracenedisulfonyl chloride | 1,5-dichloroanthracene. |
| 69 | 1,8-anthracenedisulfonyl chloride | 1,8-dichloroanthracene. |
| 70 | 2-phenanthrenesulfonyl chloride | 2-chlorophenanthrene. |
| 71 | 3-phenanthrenesulfonyl chloride | 3-chlorophenanthrene. |
| 72 | 4-chlorobenzenesulfonyl chloride | 1,4-dichlorobenzene. |
| 73 | 3-pyrenesulfonyl chloride | 3-chloropyrene. |
| 74 | 2-fluorenesulfonyl chloride | 2-chlorofluorene. |
| 75 | 4-methylbenzenesulfonyl chloride | 4-chlorotoluene. |
| 76 | 3-nitrobenzenesulfonyl chloride | 1-chloronitrobenzene. |
| 77 | 4,4'-oxybis(benzenesulfonyl chloride) | Bis(4-chlorophenyl) ether. |
| 78 | 2-pyrrolesulfonyl chloride | 2-chloropyrrole. |
| 79 | 2-furansulfonyl chloride | 2-chlorofuran. |
| 80 | 2-thiophenesulfonyl chloride | 2-chlorothiophene. |
| 81 | 3-pyridinesulfonyl chloride | 3-chloropyridine. |

What is claimed is:

1. A process for preparing a chloride of an aromatic compound selected from the group consisting of aromatic hydrocarbons, alkyl substituted aromatic hydrocarbons, halogen substituted aromatic hydrocarbons, nitro substituted aromatic hydrocarbons and phenoxy substituted aromatic hydrocarbons, comprising contacting at a temperature of from 200° C. to 300° C. and autogeneous pressure the sulfonic acid, alkali or alkaline earth metal sulfonate or sulfonyl chloride of said compound with at least one mole of carbon tetrachloride per sulfonic acid equivalent.

2. The process of claim 1 when conducted at a temperature of from 230° to 270° C.

3. The process of claim 1 wherein said sulfonic acid is 4,4'-biphenyldisulfonic acid.

4. The process of claim 3 when conducted at a temperature of from 230° to 270° C.

5. The process of claim 1 wherein a sulfonyl chloride of an aromatic compound selected from the group consisting of aromatic hydrocarbons, alkyl substituted aromatic hydrocarbons, halogen substituted aromatic hydrocarbons, nitro substituted aromatic hydrocarbons and phenoxy substituted aromatic hydrocarbons, and a mixture of at least 1 mole of carbon tetrachloride per sulfonic acid equivalent and from 0.1 to 0.3 mole of phosgene per sulfonic acid equivalent are contacted at a temperature of from 200° to 300° C.

6. The process of claim 5 wherein said sulfonyl chloride is 4,4'-biphenyldisulfonyl chloride.

7. The process of claim 5 when conducted at a temperature of from 230° to 300° C.

8. The process of claim 7 wherein said sulfonyl chloride is 4,4'-biphenyldisulfonyl chloride.

* * * * *